Figure 1:
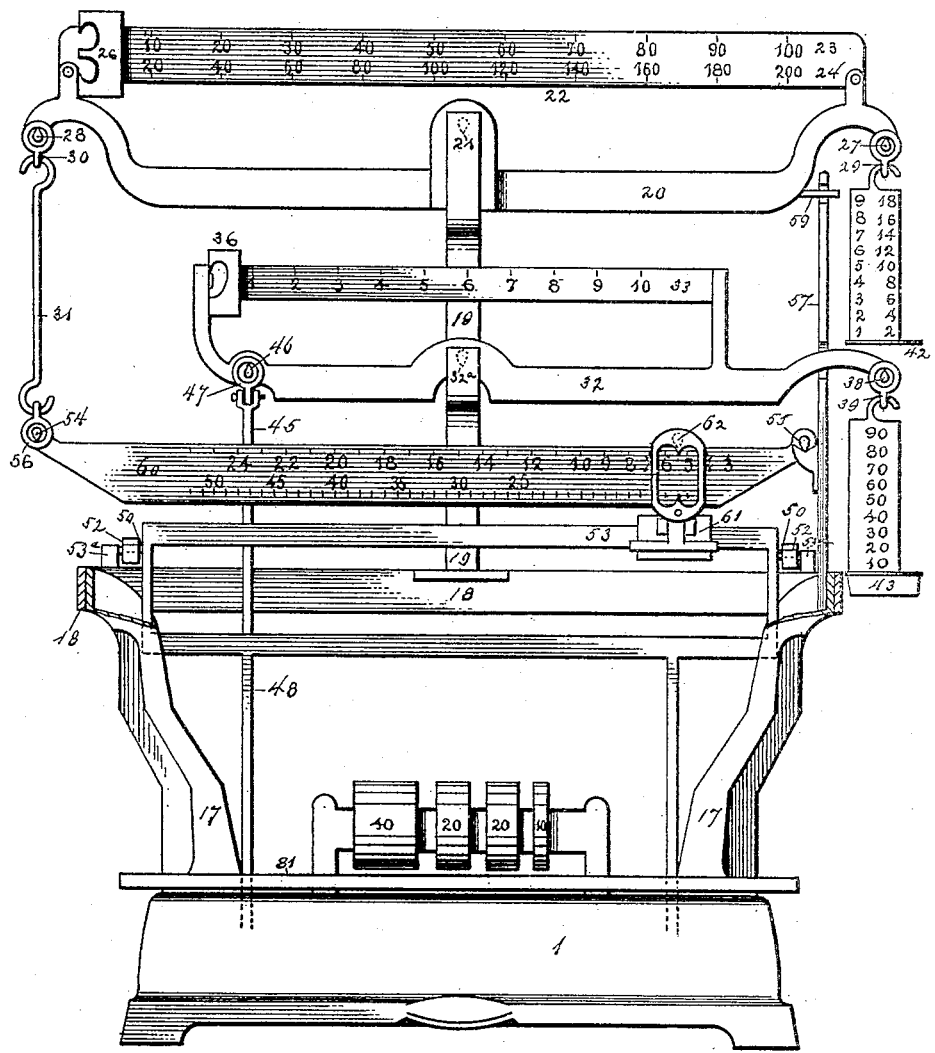

No. 816,714. PATENTED APR. 3, 1906.
J. W. CULMER.
COMPUTING SCALE.
APPLICATION FILED NOV. 23, 1904.

3 SHEETS—SHEET 1.

WITNESSES:
Geo Schreiber
S. W. Culmer.

INVENTOR
John W. Culmer

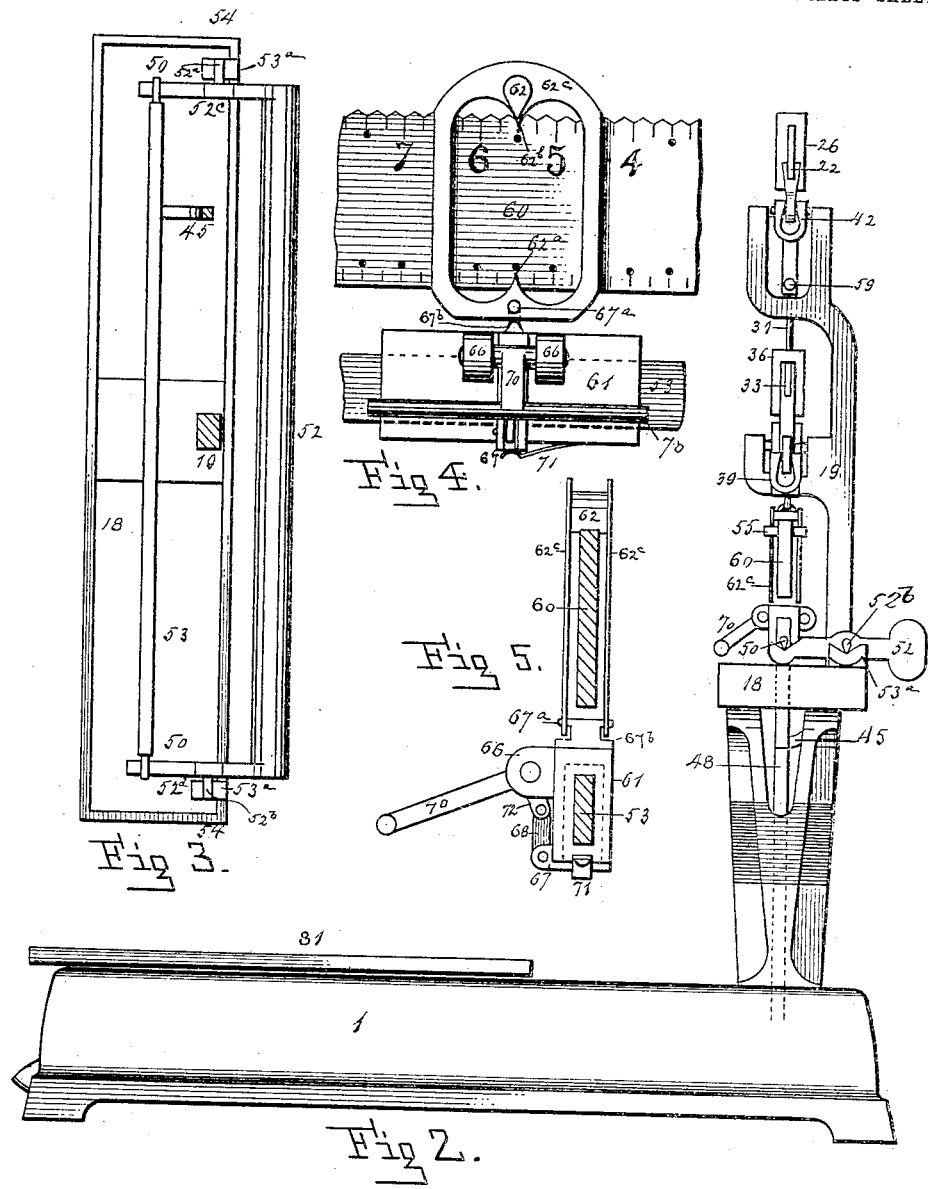

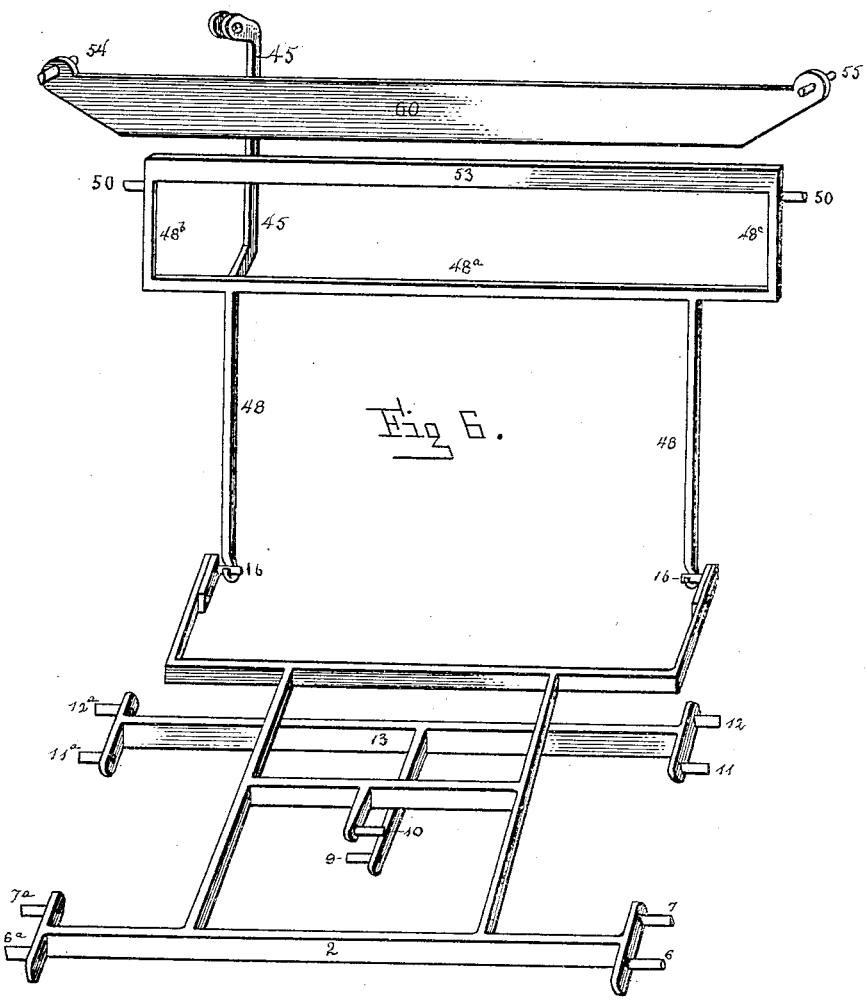

UNITED STATES PATENT OFFICE.

JOHN W. CULMER, OF CLEVELAND, OHIO.

COMPUTING-SCALE.

No. 816,714.    Specification of Letters Patent.    Patented April 3, 1906.

Application filed November 23, 1904. Serial No. 234,004.

*To all whom it may concern:*

Be it known that I, JOHN W. CULMER, a citizen of the United States, residing at Cleveland, in the county of Cuyahoga and State of Ohio, have invented a new and useful Improvement in Computing-Scales, of which the following is a specification, reference being had to the accompanying drawings and to the numbered reference-marks thereon.

The invention relates to computing-scales of the class wherein a weighing mechanism adapted to receive articles upon a weight-receiver and to indicate their weight upon a beam has combined therewith a computing mechanism detachably connectable thereto, each separate mechanism being balanced within itself independently of the other, and the weighing mechanism is operable independently of the computing parts, and the improvements herein described are directed to provide greater length of the lever upon which the connection is made between weighing and computing mechanism; to provide a means of connecting said mechanisms at any point upon said lengthened lever without disturbing the "balance" of either mechanism; to provide a structure whereby said connection may be made at any desired point without torsional strain upon either mechanism, and in such other elements and combinations as shall be hereinafter described and claimed.

In the accompanying drawings, Figure 1 is a front elevation of a scale with the front of its cap broken away, embodying the invention. Fig. 2 is a side elevation of the same with the beam-stop 57 and pendants 42 and 43, Fig. 1, removed. Fig. 3 is a top plan view of the cap 18 and parallel lever 52 mounted thereon. Fig. 4 is an enlarged detail of the connecting-fulcrum. Fig. 5 is an end view of Fig. 4, and Fig. 6 is a perspective view of the levers and the elements which connect them with the indicating mechanisms.

A base 1 of the conventional oblong form has its top open at its front end to admit the bearing portions of a weight-receiving platform 81 and at its rear end is provided with oppositely-placed columns 17 17, supporting an elongated cap 18 transversely of the base, the whole constituting a scale-frame for the reception and support of the weighing and computing elements. Within the base 1 the usual horizontal levers 2 3 are supported by the fulcrum-pivots 6 $6^a$ 12 $12^a$, and are flexibly connected by their pivots 9 10. A load-supporting platform 81 rests upon the lever-pivots 7 $7^a$ 11 $11^a$, and the lever 2 is extended beyond the short lever 3 and has its two oppositely-placed front ends provided with the point-pivots 16 16, the knife-edges of which rest within the hooked lower ends of two vertical rods 48 48, which are downward projections of a rectangular frame $48^a$, $48^b$, $48^c$, and 53, which is adapted to be pivotally supported by the pivots 50 50 within the cap 18. A rod 45, attached to one of the vertical hook-rods 48, is bent backwardly from its connection therewith to clear the upper portion of the frame 53 and the parallel multiplying-lever 60, above which it is again bent to the front to provide a connection in a vertical line with a weighing-beam 32.

Upon the rear of the cap 18 are bearing-blocks $53^a$ $53^a$, fitted as seats to receive the pivots $52^a$ $52^b$ of an equalizing-lever 52, Fig. 3. Said equalizing-lever comprises a bar 52, approximating the length of the cap 18 and provided at its ends with arms $52^c$ $52^d$, projecting to one side of said bar and fitted with bearing or fulcrum pivots $52^a$ $52^b$, which are seated in the bearing-blocks $53^a$ $53^a$ and are extended beyond said pivots $52^a$ $52^b$ and provided with seats at their outer ends to receive the pivots 50 50 of the vertically-supported horizontal bar 53, the distance between the pivots $52^a$ and 50 on the one end being identical with the distance between $52^d$ and 50 on the other end, and any strain upon the bar 53 is distributed over the equalizing-lever 52 and torsion or binding is prevented.

Centrally upon the cap 18 is erected a beam-stand 19, upon which, in vertical alinement with the bar 53, are constructed beam-seats for the reception of a weighing-beam 32 and a value-beam 20, so arranged that said beams shall vibrate in vertical and horizontal alinement with the bar 53 and the point-pivots 16 16. At the right-hand end of the cap 18 is affixed a vertical beam-stop 57, having an inwardly-projecting pivot-seat for the reception of the fulcrum-pivot of a multiplying-lever 60, an opening for the neck of the weighing-beam 32, and an opening to receive a pin 59 on the beam 20, whereby the movement of said beams is limited.

Upon the beam-stand 19 and within its proper seat a weighing-beam 32 is pivotally supported on its fulcrum-pivot $32^a$ and has its load-pivot 46 connected by a loop 47 to the rod 45, which connects with the lever 2 through the hook of the downwardly-projecting vertical rod 48. At its other extremity beam 32 is provided with a point-pivot 38, a loop 39 thereon, and a pendant-poise 43, suspended from said loop. It is further provided with a scale-bar 33, graduated in denominations of weight (as pounds and ounces) and a slidable poise 36 thereon to indicate upon said graduated scale.

A multiplying-lever 60 has its one end supported, by its pivot 55, upon a projecting seat on the beam-stop 57. Said lever 60 extends parallel with and above the cap 18 and parallel with and above the bar 53 and is provided at its outer end with a pivot 54 and a loop for connection with a value-beam fulcrumed above on the beam-stand 19.

The value-beam 20 is fulcrumed at 21 centrally of its length within its seat in the beam-stand 19 and is fitted with equidistant point-pivots 27 28, from which are suspended loops 29 30. From loop 30 the value-beam 20 is connected with the multiplying-lever 60 by the rod 31, which has its lower end hooked into the loop 56 of the lever 60. At the outer end of the value-beam 20 is suspended from its point-loop 29 a pendant-poise 42, adapted to receive loose weights and provided with a plurality of vertical scales which are continuations, in whole numbers, of the horizontal scales upon the value-bar 22, and both of which scales are products of a weight upon the weighing mechanism at the multiple at which the multiplying-lever 60 is connected therewith. The lever 60 is graduated in spaces indicating equal increments of leverage from its fulcrum 55 toward its point 54, and any desired number of price-scales may be made upon its sides, all of which must agree with the aforesaid graduations, although each will represent a different multiple. Thus the upper scale may represent one-quarter cent to each increment, a second scale may represent one-half cent to each such increment, and another or others may be added at higher or lower multiples. The scales upon the bar 22 and the pendant 42 must be made to accord with these price-scales, and the relation of leverage between the weighing-indicator's pendant 43 and its loose weights shall be in accord with the point upon lever 60 at which the two mechanisms are in unison. Thus, assuming the levers 2 and 3 to have a multiple of six and two-fifths at their connection 16 16 with the bar 53 and the weighing-beam 32 so related as to its load-pivot 46 and fulcrum 32$^a$ on the one side and said fulcrum 32$^a$ and its point-pivot 38 on the other side that the total multiplication at the pendant 42 is 20, and therefore that one pound upon said pendant 42 will balance twenty pounds upon the platform 81 and it is desired that upon one price-scale each pound shall represent ten cents' worth and upon the other price-scales each pound shall represent a multiple or submultiple of ten cents' worth, then the multiplying-lever 60 is divided into one hundred and twenty spaces, each representing one-fourth cent upon the basic price-scale, and at the ten-cent price upon that scale the loose weight, balancing ten pounds on the weighing-pendant 43, will balance one dollar's worth on the pendant 42, and at any other price upon said price-scale it will balance one dollar's worth at that price.

It is necessary that there shall be a means of connecting the weighing mechanism, which operates at a constant or fixed multiplication of leverage, with the computing mechanism at any desired multiple upon the lever 60, and it is desirable that said connection should be easily manipulated, positively fixed relatively to the fulcrum 55 of the lever 60 when in place, and sufficiently flexible to prevent any binding or friction of the parts when connected. A preferred form of construction is shown in Fig. 4, in which the lever 60 is shown notched at the angle usual in pivot-bearings, so that a knife-edged connecting-pivot being lowered into the notch will be led to its bearing at the bottom of said notch which coincides with the multiplication-graduations. Surrounding the horizontal bar 53 is a sleeve 61, slidable upon said bar. Upon the front of the sleeve 61 are two projecting journal-bearings 66 66, in which is journaled the stem of a T-shaped handle 70, which has a projection 72 below and at right angles with said stem. A central vertical groove is made in the sleeve 61, as shown in dotted lines in Fig. 5, and across the bottom of the sleeve 61 the metal is cut away to join the opposite grooves and to expose the bottom of the bar 53. Within the vertical seat thus formed a rectangular link 67 is fitted. Upon its lower front is a projection into which a connecting-link 68 is connected by a pin, and the other end of said link 68 is connected with the projection 72, so that when the handle 70 is raised the rectangular link 67 is raised, and when the handle is depressed to its lowest point the projection 72 has passed the vertical line of the journals and abuts against the sleeve 61 and can be raised only by lifting the handle 70. A spring 71, made fast at its one end to the sleeve 61 and having its free end supporting the link 67, holds said link and its connecting-frame up normally out of engagement with the multiplying-lever 60. Upon the upper end of the rectangular link 67 it projects to the front and rear to form journals 67$^a$, upon which the indicating-frame 62$^c$ is supported. A knife-edged connecting-pivot 62, Figs. 4 and 5, of greater length than the thickness of the multiplying-lever 60, has two counterpart plates 62$^c$ made fast at its ends, said plates being constructed as open frames and having their lower ends journaled upon the oppositely-placed journals 67$^a$, whereon a rocking motion is limited by the shoulders 67$^b$ on the rectangular link 67. In vertical alinement with the edge of the connecting-pivot 62 and the center of the journal 67ª indicating-points 62ª and 62ᵇ project upon their corresponding price-scale graduations on the multiplying-lever 60.

The operation of the scale is similar to that of the computing-scales in common use. To ascertain the weight of a given article, it is placed upon the platform 81, and the poise 36 on the bar 33 is moved out from zero to a point at which the beam rests in balance. If the article is of greater weight than can be indicated upon the bar 33, loose weights are placed upon the pendant 43, said weights indicating thereon even multiples of the capacity of the bar 33, and the fraction less than that even multiple is ascertained by the poise 36 upon the bar 33. To ascertain the money value of any article, it is placed upon the platform 81. The carriage 61 is moved along the bar 53 until one of the points 62ª 62ᵇ rests at the graduation showing the desired price. The handle 70 is brought down, thereby forcing the edge of the connecting-pivot 62 into the notch corresponding with the indicated price. The throwing down of said handle brings the connecting-points of the link 68 on the projection 72 and the vertically-moving pivot-bearing link 67 past the vertical line, so that they rest against the sleeve 61 and are locked fast. The article upon platform 81 is then balanced upon its appropriate scale on the value-bar 22 or upon the pendant 42 by loose weights and the value-bar 22 by the poise 26 in coöperation, and the amount thus indicated is the money value at the chosen price of the article. In ascertaining weight it is not material at what point the connecting - pivot 62 may be nor whether it be in contact with the multiplying-lever 60 or not.

The equalizing-lever 52 is pivoted parallel to lever 2, and the arcs of vibration of the points on said lever 2 at which it receives the pivots 50 are tangent to the same vertical plane to which the arcs of vibration of the knife-edges 16 are tangent.

I claim—

1. In a scale, a horizontal base, an elevated cap transverse the base, a horizontally-positioned weight - supporting lever system the members of which are respectively fulcrumed near opposite extremities of the base, a horizontally-positioned cross-bar above the cap, having its ends connected with the free end of one of the levers within the base, an equalizing-lever pivotally supported on the cap, and pivotally supporting the cross-bar at its opposite ends, a weighing-beam fulcrumed above and parallel with the cap, and a positive connection between said weighing-beam and said pivotally - supported cross-bar, as shown and described.

2. In a scale, a frame comprising a horizontal base, a horizontal cap above and transverse of one end of said base, a central vertical beam-stand having two vertically-alined beam-seats, and an end - positioned vertical beam-stop having two beam-limiting openings and a fulcrum-seat made fast upon said cap, as shown and described.

3. In a scale of the class described, a weight-supporting lever system the members of which are respectively fulcrumed near opposite extremities of the base, a horizontal bar having its ends connected with said levers, a horizontal equalizing - lever pivotally supporting said bar, a weighing - beam centrally fulcrumed above said bar and having its load - pivot positively connected therewith, a weighing-scale bar, with a slidable poise, and a pendant for loose weights upon said weighing - beam, a graduated-price bar parallel with said horizontal bar, a superposed value - beam, a positively - connected link between said value-beam and said horizontally-positioned price-bar, and an adjustable link between said price - bar and said horizontal vertically-movable bar, as shown and described.

4. In a scale of the class described, a weighing mechanism as described, a pivotally-supported horizontal bar, a multiplying - lever fulcrumed upon the frame and parallel with the said bar of the weighing mechanism, a value - beam fulcrumed above and parallel with said elements, connected at its load-pivot, with the said multiplying-lever, and a link comprising a body embracing the horizontal bar and slidable thereon, a frame surrounding the multiplying-lever and provided with a pivot adapted to contact with the upper edge of said lever, a handle pivoted upon the said body and a link connecting said handle with said frame, whereby the pivot may be brought into contact with the multiplying - lever or released therefrom, as shown and described.

5. In a computing-scale a weighing mechanism having a horizontal bar member pivotally supported at its ends, a computing mechanism comprising a value-beam with a multiplying-lever fulcrumed above and parallel with the pivotally end-supported bar member of the weighing mechanism, and a connecting-pivot, a frame surrounding said multiplying-lever supporting said pivot, a block embracing said horizontal bar, a handle journaled upon said block and a link connecting said handle with the frame surrounding the multiplying-lever, whereby said pivot may be moved along said bar and connected with said multiplying - lever as shown and described.

6. In a computing-scale having a weighing mechanism with a horizontal cross-bar member pivotally supported at its ends, and a computing mechanism having a fulcrumed graduated and notched multiplying - lever parallel with said bar; a connecting-pivot carriage comprising a sleeve adapted to be moved upon the said cross-bar and fitted with a link vertically movable on said sleeve, counterpart frames journaled upon said vertically-movable link and arising upon both sides of the aforenamed multiplying-lever, a pivot connecting said counterpart frames above the inclosed lever, pointers in said frames adapted to indicate upon graduations on the said lever, shoulders on the vertically-movable link adapted to limit the rocking movement of the journaled frame, a handle journaled on the sleeve and a link connecting said handle with the vertically-movable link, as shown and described.

7. A computing-scale comprising a weighing mechanism having horizontal weight-supporting levers, a horizontal bar transverse and connected at its ends to one of said levers, a horizontally-fulcrumed equalizing-lever pivotally supporting said horizontal bar, a weighing-beam connected by its load-pivot to said bar and provided with a graduated weight-scale, a poise to indicate thereon and a pendant to receive loose weights; and a computing mechanism having a multiplying-lever fulcrumed above and parallel with said horizontal bar, and provided with equal-spaced notches on its upper edge, and a plurality of equal-spaced graduated price-scales on its sides in register with said notches; a superposed value-beam having a plurality of value-scales, adapted to coöperate with the price-scales of the multiplying-lever, a poise to indicate thereon, a pendant for loose weights adapted to coöperate with both price and value scales and indicating their maximum graduations of weight or value, a flexible connection between the value-beam and the multiplying-lever, and a connecting-pivot adapted to be moved longitudinally upon the horizontal bar of the weighing mechanism, and forced into any desired notch of the multiplying-lever of the computing mechanism, as shown and described.

In testimony whereof I have signed my name to this specification in the presence of two subscribing witnesses.

JOHN W. CULMER.

Witnesses:
ERNEST SCHWARTZ
S. J. CULSOT.